(12) United States Patent
Henry

(10) Patent No.: US 7,419,049 B2
(45) Date of Patent: Sep. 2, 2008

(54) ARCHIMEDEAN CONVEYORS AND COMBUSTION ENGINES

(76) Inventor: James D. Henry, 817 S. 200th St., Seattle, WA (US) 98198

( * ) Notice: Subject to any disclaimer, the term of this patent is extended or adjusted under 35 U.S.C. 154(b) by 97 days.

(21) Appl. No.: 11/063,336

(22) Filed: Feb. 22, 2005

(65) Prior Publication Data

US 2005/0189199 A1    Sep. 1, 2005

Related U.S. Application Data

(60) Provisional application No. 60/546,566, filed on Feb. 20, 2004.

(51) Int. Cl.
- B65G 33/26    (2006.01)
- B65G 41/00    (2006.01)
- B65G 19/00    (2006.01)
- B65G 25/00    (2006.01)
- B65G 35/00    (2006.01)
- B65G 21/00    (2006.01)

(52) U.S. Cl. .................. 198/676; 198/717; 198/860.3; 198/660

(58) Field of Classification Search .............. 198/717, 198/671, 676, 677, 662, 660, 860.3, 716
See application file for complete search history.

(56) References Cited

U.S. PATENT DOCUMENTS

| | | | |
|---|---|---|---|
| 1,632,569 A | 6/1927 | Taylor | 104/25 |
| 2,259,748 A | 10/1941 | Hullhorst | 198/345.1 |
| 2,355,244 A * | 8/1944 | Scholl | 198/550.1 |
| 2,536,240 A | 1/1951 | Vincent | |
| 2,613,799 A | 10/1952 | Bawden et al. | |
| 3,729,088 A | 4/1973 | Stein et al. | 198/127 R |
| 3,808,980 A | 5/1974 | Winiarski | 104/167 |
| 3,811,385 A | 5/1974 | Johnson et al. | 104/167 |
| 3,842,961 A | 10/1974 | Burson | 198/16 R |
| 4,373,845 A * | 2/1983 | Henke | 414/326 |
| 4,541,297 A | 9/1985 | Fujita | 74/424.6 |
| 4,567,979 A | 2/1986 | Hoehn | 198/750 |
| 4,640,230 A * | 2/1987 | Van Rooijen | 119/57.2 |
| 4,730,554 A * | 3/1988 | Kristiaan | 99/546 |
| 4,750,274 A | 6/1988 | Erdman, Jr. et al. | 34/39 |
| 5,303,814 A * | 4/1994 | Ohtsuji et al. | 198/659 |
| 5,451,137 A | 9/1995 | Gorlov | |
| 5,875,882 A * | 3/1999 | Pollock | 198/674 |
| 6,013,140 A | 1/2000 | Simoneaux | |
| 6,193,053 B1 * | 2/2001 | Gaalswyk | 198/662 |
| 6,544,015 B1 | 4/2003 | Kaechele | |
| 6,598,708 B2 | 7/2003 | St-Germain et al. | 187/271 |
| 6,763,932 B2 | 7/2004 | Stenson et al. | |
| 2001/0005486 A1 | 6/2001 | Wood | |
| 2002/0104739 A1 * | 8/2002 | Yoshikawa | 198/676 |

* cited by examiner

Primary Examiner—Gene O. Crawford
Assistant Examiner—Ramya G Prakasam
(74) Attorney, Agent, or Firm—Seed IP Law Group PLLC

(57) ABSTRACT

A helical screw conveyor having a helical screw rotatably mounted within a casing and cooperating with a chain of platens to convey objects from one end of the casing to the other end or to selected locations therebetween. A thermodynamic combustion engine is provided having a helical screw rotatably mounted within a casing and cooperating with a platen chain to draw a combustible mixture into the casing, compress the mixture for ignition, and exhaust the burned mixture therefrom.

4 Claims, 14 Drawing Sheets

ARCHIMEDEAN CONVEYORS AND COMBUSTION ENGINES

BACKGROUND OF THE INVENTION

1. Field of the Invention

The present invention is directed to Archimedean-type screws and, more particularly, to helical screw conveyors and helical combustion systems.

2. Description of the Related Art

An Archimedes screw consists of a helical element or screw rotatably mounted inside a close-fitting open-ended cylinder. One end of the cylinder is placed in water and the other end is inclined above the horizontal. As the screw is turned, the helical flight on the screw draws water into the cylinder and carries it to the upper end where the water is discharged.

The Archimedean principle is applied to modern devices for conveying bulk material and to machines for drilling and extraction, food processing, and irrigation. For example, U.S. Pat. No. 4,750,274 discloses a sludge-processing device that utilizes two screw conveyors mounted inside a heat exchanger housing. The screw conveyors are rotated by a motor assembly to pass a sludge mixture through the heat exchanger.

A simple screw conveyor design utilizes a single flight helically formed around a central shaft, with the pitch and angle of the flight determined by the intended use. Flexible screw conveyors or centerless auger conveyors utilize a spring steel or a stainless steel helix that is enclosed within a flexible plastic tube and driven by an electric motor. When the flexible screw is rotated, an exposed section of the screw feeds material into the tube where it is then propelled to the discharge end. Flexible and rigid screw conveyors may be combined to form multiple intake and discharge point systems that can convey bulk material over short to medium distances, feed multiple discharge points selectively, and generally move material vertically, horizontally, or at any angle over, under, or around obstructions.

Screw conveyors are particularly useful in the food, drug, agricultural, general industry, and mining industries where a fully contained, metered effect is required. Sophisticated control systems monitor and regulate in-feed hoppers, discharge chutes, and the routing of the material as required.

BRIEF SUMMARY OF THE INVENTION

The Archimedean principle has yet to be utilized for compression, for propulsion, and for internal combustion engines. The disclosed embodiments of the invention are directed to the use of the Archimedean principle in conveying people and goods, and in generating power through an internal combustion design. Further embodiments of the invention are disclosed wherein a helical screw is used for compressing, for pumping, or is driven by air, steam, water, oil, or any gas or liquid to function as a motor.

In accordance with one embodiment of the invention, a system is provided that includes an input for receiving objects, a helical screw means receiving objects from the input, means for containing the objects on the helical screw means and forming a movable compartment on the helical screw means; means for driving the helical screw means; and an output for receiving objects from the helical screw means. Ideally, the helical screw means is a helical screw having a helical flight formed on a shaft. The helical screw can include more than one flight. The driving means can include an external motor, a pump, a pressurized substance, or combustion of objects drawn into compartments formed by the helical screw, a casing, and a plurality of platens cooperating with the helical screw and the casing.

In accordance with one embodiment of the invention, a helical screw conveyor is provided that includes a motor-driven helical screw rotatably mounted inside a casing and cooperating with a chain of platens to convey objects from an input port to an output port in the casing.

Ideally, the chain of platens is formed of a plurality of platens, each platen having a first edge configured for writing between flights on the helical screw, and each platen connected to an adjacent platen via a link. Preferably, the link is similar to a chain link that allows each platen to pivot about an axis that is transverse to the plane of the platen, with each platen formed of a substantially flat piece of material having mutually opposing planar sidewalls. The material ideally is of sufficient strength to withstand the forces generated in the conveying process.

In accordance with another aspect of the foregoing embodiment, the plurality of platens are formed in a continuous loop mounted to a support that enables the chain of platens to travel around the support in a continuous loop as the screw rotates, whereas rotation of the helical screw drives the continuous loop of platens.

In accordance with another aspect of the foregoing embodiment, the casing is preferably formed of a cylindrical wall having a slit formed therein sized and shaped to allow the plurality of platens to project into the casing and ride between respective flights of the helical screw. In this manner, the platen, the helical screw, and the casing cooperate to form compartments that move within the casing as the helical screw rotates.

In accordance with another embodiment of the invention, a combustion engine is provided having a rotary helix mounted inside a casing and cooperating with a chain of platens to combust a fuel and generate power.

In accordance with yet another embodiment of the invention, a motor is provided having a helical screw mounted inside a casing and having an input for receiving a pressurized fluid or material and an output for exhausting the same, and a chain of platens cooperating with the helical screw and casing, whereby the helical screw is turned by the pressure of the fluid or material injected into the casing. Alternatively, the helical screw can be driven to draw a compressible fluid into the intake and compress it inside the casing for discharge through an exhaust port under pressure for pumping purposes or for storage.

BRIEF DESCRIPTION OF THE SEVERAL VIEWS OF THE DRAWING(S)

The foregoing features and advantages of the disclosed embodiments of the invention will be more readily appreciated as the same become better understood from the following detailed description when taken in conjunction with the accompanying drawings, wherein.

DETAILED DESCRIPTION OF THE INVENTION

Figure 1:
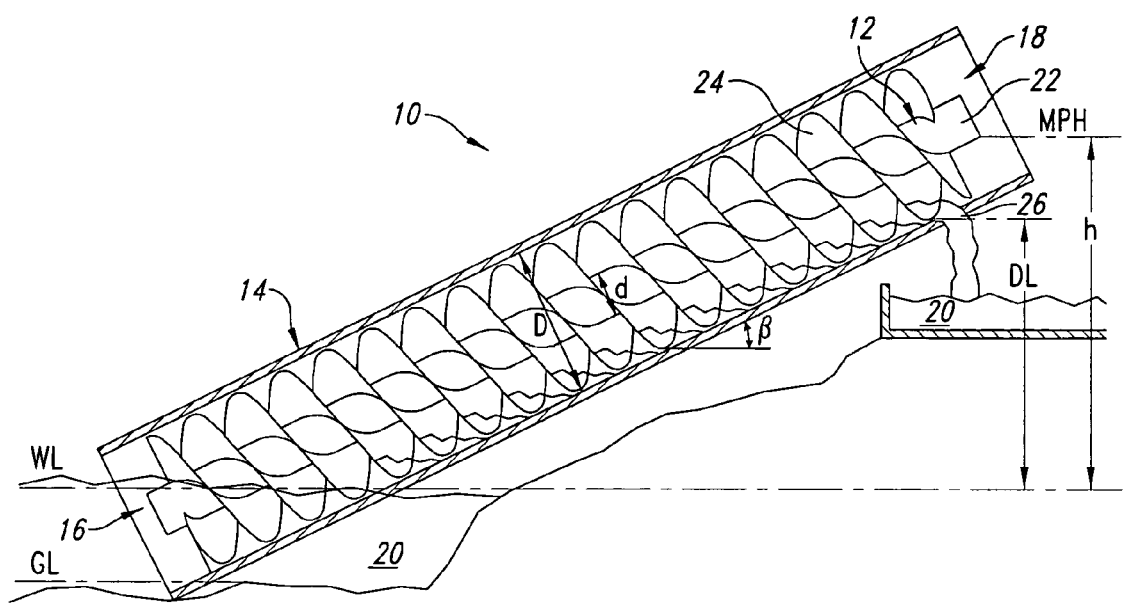
FIG. 1 is a cross-sectional view of an Archimedes screw employed in conveying water up an incline.

FIG. 1 illustrates a known hydraulic screw device 10 in which a helical screw 12 is mounted inside a tube 14 having open ends 16, 18 for raising water 20 from a ground level (GL) to a discharge level (DL). The helical screw 12 includes an elongate longitudinal shaft 22 having a helical flight 24 formed around the exterior thereof. As the helical screw 12 rotates, water 20 is drawn through a first open end 16 of the tube 14 and conveyed upward to a discharge port 26 formed adjacent the second end 18 in the tube 14.

The helical screw device 12 shown in FIG. 1 is a simple, single-blade screw that is inclined at approximately a 40-45 degree angle. The diameter of the helical flight 24 is represented by D, and the diameter of the shaft 22 is represented by d. The angle of inclination is shown as β, and the maximum pumping height is represented by the distance h. The discharge level (DL) is the distance from the water line (WL) to the discharge port 26. The geometry of the hydraulic screw 10 is governed by certain external parameters, which in turn are determined by the location of the hydraulic screw 10 and how much fluid or material is to be lifted at what angle.

The capacity of the hydraulic screw device 10 is determined by the external parameters, such as its outer radius, length, and slope, as well as the internal parameters, such as its internal radius, number of blades or flights, and the pitch thereof. It has generally been observed that the rotational velocity of a screw, in revolutions per minute, should not exceed $50/D^{2/3}$, where D is either the outside diameter of the helical screw or the outside diameter of the tube. A rotational speed greater than the foregoing causes turbulence and sloshing, such that the helical screw 12 churns the water 20 and does not efficiently lift the water 20.

Equilibrium water volume is generally defined as the maximum volume of water that can be held between the flights of the helix when the screw 12 is stationary. When the helical screw 12 initially rotates, an amount greater than the equilibrium water volume is initially drawn in at each revolution. As the water 20 is raised with each turn of the helical screw 12, the excess water 20 will cascade down to a lower flight. As the water level near the intake reaches a certain critical level, the efficiency of the hydraulic screw device 10 begins to drop because less than the equilibrium volume is drawn in with each revolution. Additional flights or blades can be used depending on the application. A double helix configuration is preferred in certain applications to maintain the balance of the helical screw when it turns, especially at high speeds.

Figures 2, 3:
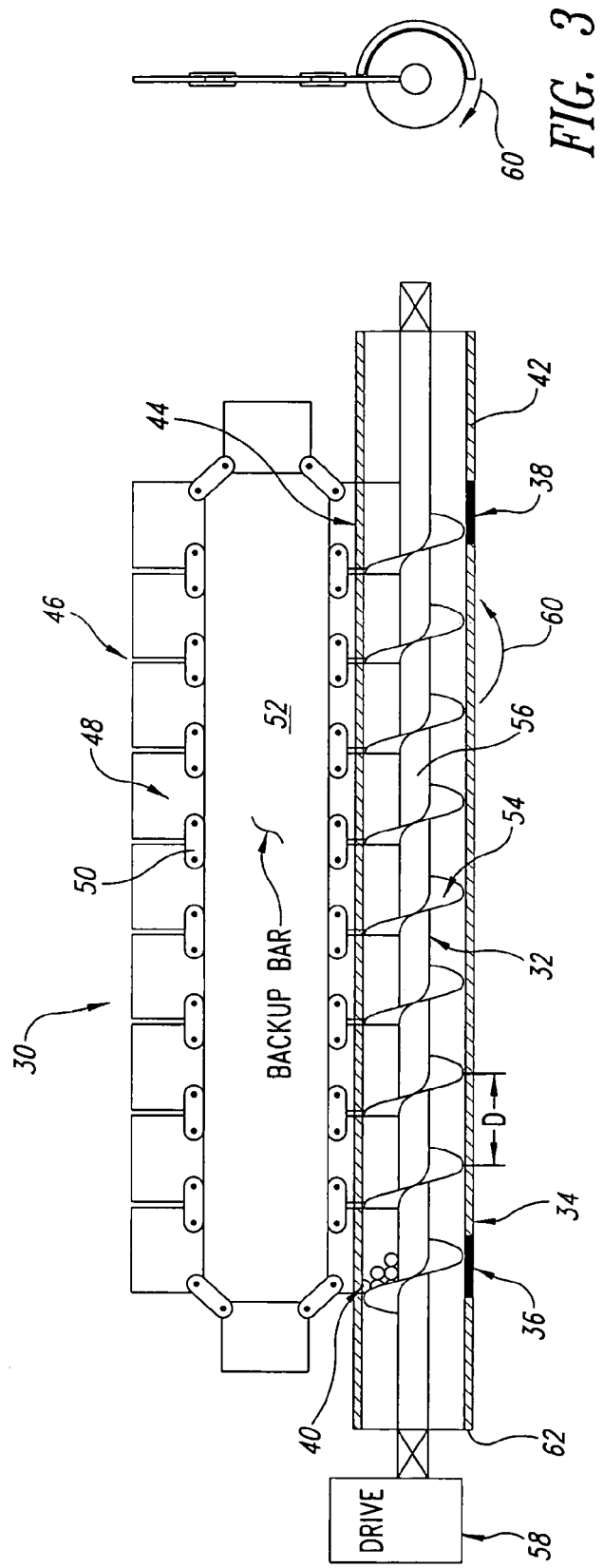
FIG. 2 is a side view in partial cross-section of a conveyor system formed in accordance with one embodiment of the present invention.
FIG. 3 is a top view in partial cross-section of the conveyor system of FIG. 2.

Referring next to FIGS. 2 and 3, shown therein is a first embodiment of the invention in the form of a helical screw conveyor system 30 in which a helical screw 32 is mounted inside a casing 34 having an inlet port 36 and an outlet port 38 for conveying bulk product 40. The casing 34 is formed of a side wall 42 that is substantially cylindrical and has a longitudinal slit 44 formed therein to receive a platen chain 46 composed of a plurality of platens 48 chained together by links 50 in a continuous loop to move around a backup bar 52. The individual platens 48 are sized to have a close fit between each flight of the helix and against the shaft 56. The slit 44 in the casing 34 is sized and shaped to allow the platens 48 to slide therethrough and interact with the helical screw 32.

The helical screw 32 includes a single helix 54 formed around a central shaft 56. As shown in FIG. 2, the helix 54 is formed to have a substantially standard pitch as represented by the distance D, such that the pitch is equal to the diameter of the helical screw 32. It is to be understood that other pitches may be used, such as a short pitch, half pitch, long pitch, or a double flight screw having a standard pitch, and other configurations suitable for a desired application. For example, a flight pitch reduced to two-thirds diameter is recommended for inclined or vertical applications, and this particular pitch is known to retard flushing of materials that can fluidize. A one-half standard pitch is generally used for vertical or inclined applications, for screw feeders, and for handling extremely fluid materials.

A drive motor 58 is coupled to one end of the shaft 56 to rotate the shaft 56 and the helix 54 inside the casing 34. In the embodiment shown in FIG. 1, the helical screw 54 is in a right-hand configuration such that counterclockwise rotation will move the bulk product 40 from the inlet port 36 to the outlet port 38. Thus, when the helical screw 32 is rotated in the direction shown by the arrow 60, the bulk product 40 will move away from the drive motor end 62 of the casing 34 and towards the outlet port 38.

In operation, as the drive motor rotates the helical screw 32, bulk product is introduced through the inlet port 36 to ride on the flight and bear against the platen 48 as it moves upward in the casing 34 towards the outlet port 38. To encourage the bulk product to exit through the outlet port 38, the outside edge of the flight 54 adjacent the outlet port 38 can be angled slightly downward or towards the drive motor end 62. Interference with the cooperating platens 48 will be avoided by positioning the chained platens 46 such that the platen 48 near the outlet port 38 will exit from the casing prior to the downward-turned flight encountering it. In addition, the platens can be modified to include a shelf, ledge, or bottom wall projecting outward therefrom. Such a projection could be formed at a 90° angle to the platen. Goods or bulk product could be placed on the projection for transport, thus avoiding contact with the moving helix 54.

Although the conveyor 30 is shown in a horizontal position, it is to be understood that it can be inclined or oriented in a vertical position as desired. It is to be understood that this particular configuration can also be used for a moving sidewalk when in a horizontal position or as an elevator when in a vertical position. When used as an elevator, objects may rest or people may stand on a ledge projecting outward from one or both sides of the platen 48.

In this embodiment of the invention, each of the individual platens 48 are formed to have a substantially planar configuration with mutually opposing sidewalls that are substantially flat. Each of the platens has a projecting edge that is configured to have a close fit between each flight of the helix and against the central shaft 56 to prevent objects from slipping therebetween. Ideally the platen is formed of material of sufficient strength to resist wear and to uphold and withstand the forces exerted against it when conveying product or objects. An opposing edge of each platen 48 is configured to ride adjacent, preferably in spaced relationship to, the backup bar 52. In one embodiment, the edge of the platen 48 can ride in a slot or groove formed in the backup bar 52 to provide stability to the platen 48. Each of the links 50 is coupled to on end a first platen and on a second end a second platen to enable the platens to pivot about individual axes that are transverse to the plane of the platen.

A suitable control system can be utilized to control operation of the intake and exhaust valves, ignition, and combustion mixtures. Such a system can be mechanical or electromechanical or electrical, and would control timing, duration, and amount, such as how far a valve opens, the amount of current or the amount of voltage.

Figure 4A:
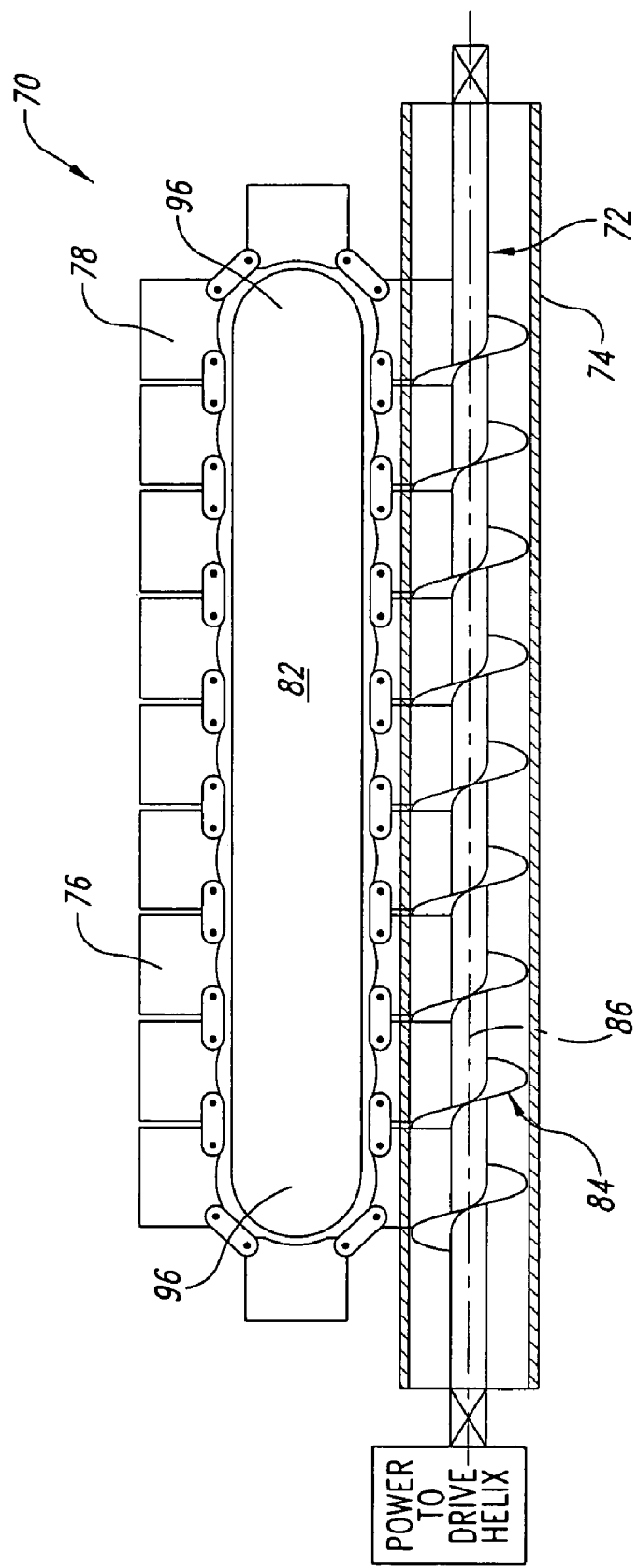
FIGS. 4A-4B are partial cross-sectional views of another embodiment of the present invention.
Figure 4B:
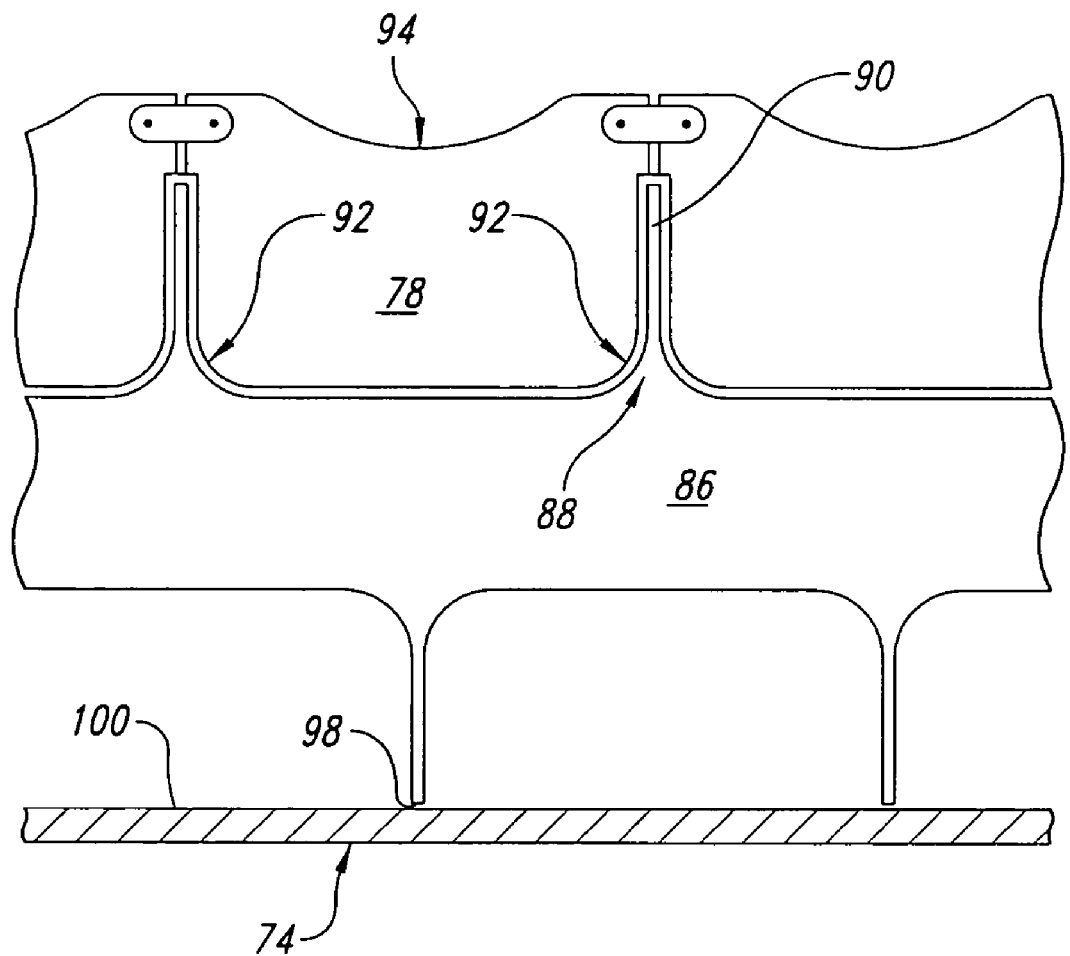

FIGS. 4A-4B illustrate another embodiment of the invention wherein the hydraulic screw conveyor 70 includes the hydraulic screw 72 mounted inside a casing 74 and cooperating with a platen chain 76 composed of individual platens 78 chained together by links 80 around a backup bar 82. The helical screw 72 includes a single helix 84 formed around a central shaft 86 such that, as shown in FIG. 4B, the helix 84 is formed to have a fillet 88 where the individual flight 90 joins the shaft 86. The platen 78 riding between the flights 90 has a corresponding corner 92 with a radius to match the radius of the fillet 88. Preferably, a close fit between the platen 78 and the helical screw 72 is used; however, smooth insertion and removal of the platen 78 from between the flights 90 is accomplished with the use of the rounded corners on the platens and the corresponding fillet portions 88 on the helical screw 72. In addition, each platen 78 has a first side wall 94 with an arcuate shape that matches the rounded ends 96 of the backup bar 82. A close fit is also used between an exterior edge 98 of the helix 84 and the interior wall 100 of the casing 74. This fit permits moving and stationary parts to cooperate without binding and to move the product, whether it be bulk goods, fluid, or other material within the conveyor 70.

Figure 5A:
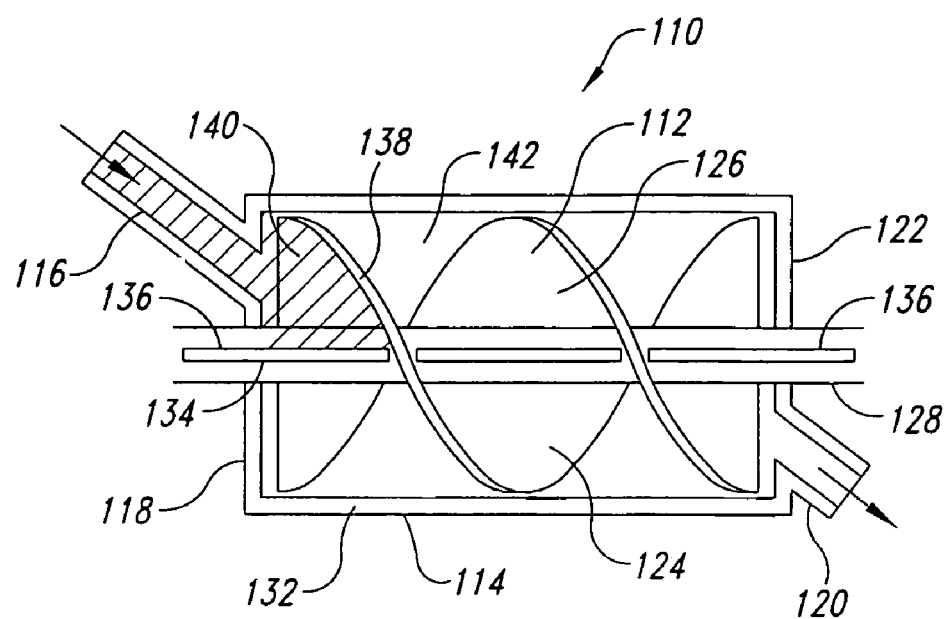
FIGS. 5A-5B are a cross-sectional side view and top view, respectively, of a further embodiment of the present invention.

Turning next of FIG. 5A, another embodiment of the invention is illustrated therein in the form of a helical screw motor 110 having a double helix screw 112 rotatably mounted inside a casing 114 that has an input port 116 formed at a first end 118 of the casing and an output port 120 formed at a second end 122 of the casing 114. The double helix screw 112 is comprised of two helixes 124, 126 of the same pitch and size mounted to a single shaft 128.

Figure 5B:
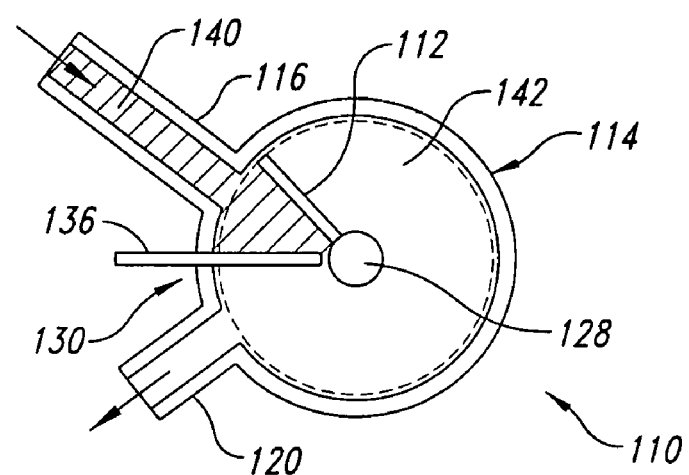

As shown more clearly in FIG. 5B, the casing 114 has a slit 130 formed in the side wall 132 in which is received a platen chain 134 comprised of individual platens 136 chained together in the same manner as described with respect to FIGS. 2 through 4A-4B. The platens ride between the individual flights 138 of the double helix screw 112 and cooperate with the casing 114 to convey a medium 140 through the casing 114 from the input 116 to the output 120.

In operation, a medium, such as a bulk product, fluid, or other material is introduced under pressure through the input 116 and into the interior 142 of the casing 114. The pressurized medium contacts the platen 136 and the double helix screw 112 to force the screw 112 to rotate inside the casing 114. As the screw 112 rotates, the medium proceeds through the casing 114 to the output port 120, where it exits the casing 114. As such, the helical screw motor 110 functions as a transducer that transforms the pressure of the introduced medium 140 into rotational motion of the shaft 128, the output force of which can be used for driving other mechanical equipment or electromechanical equipment, such as a generator. The use of the double helix is preferred to maintain balance of the screw 112 in view of the high rotational speed generated by the pressurized medium 140.

Figure 6A:
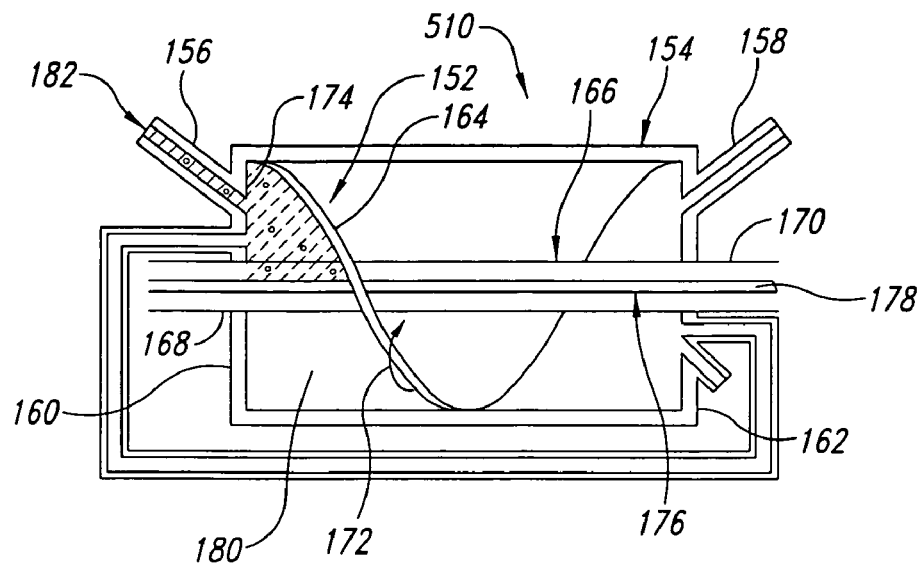
FIGS. 6A-6Q are cross-sectional views of an engine formed in accordance with yet a further embodiment of the present invention.
Figure 6B:
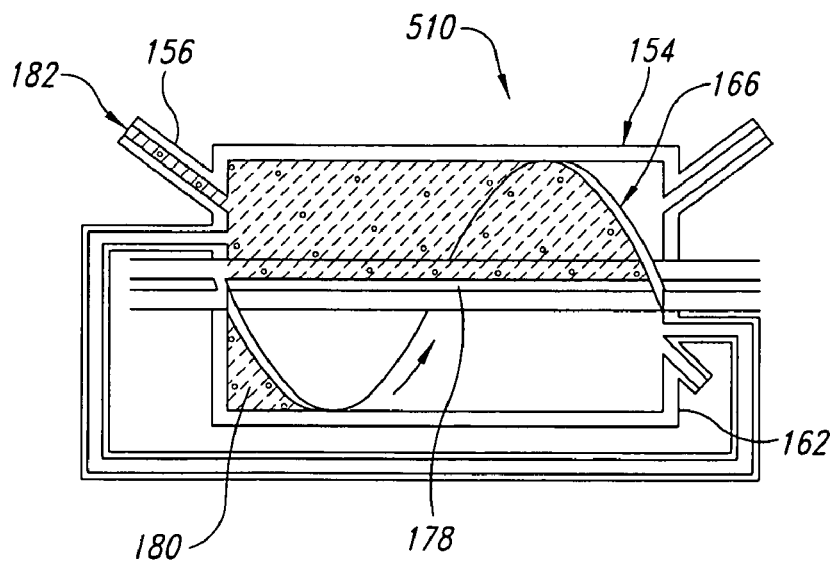
Figure 6C:
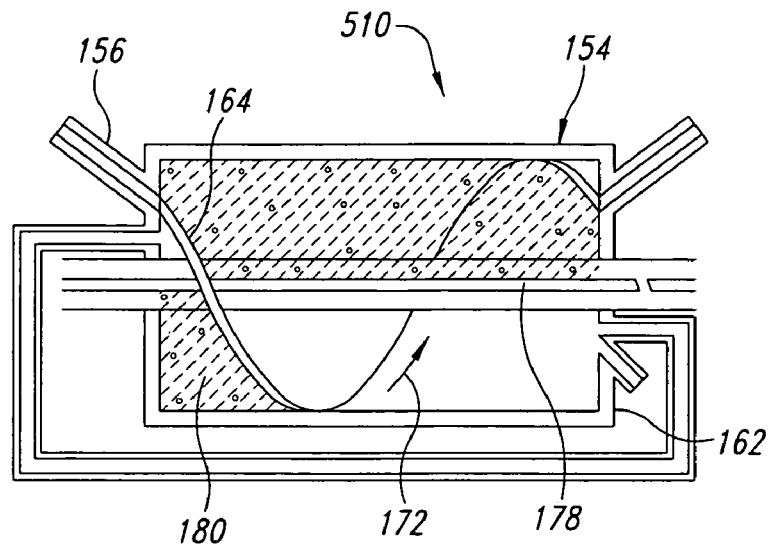
Figure 6D:
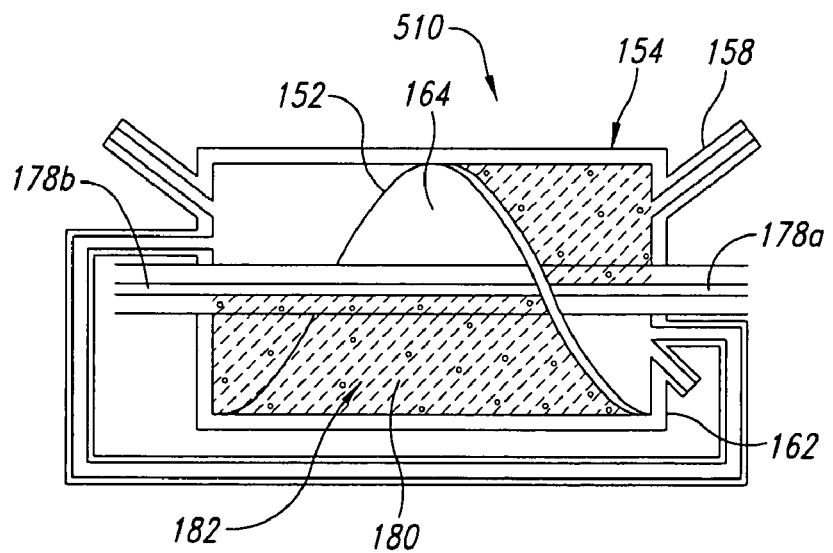
Figure 6E:
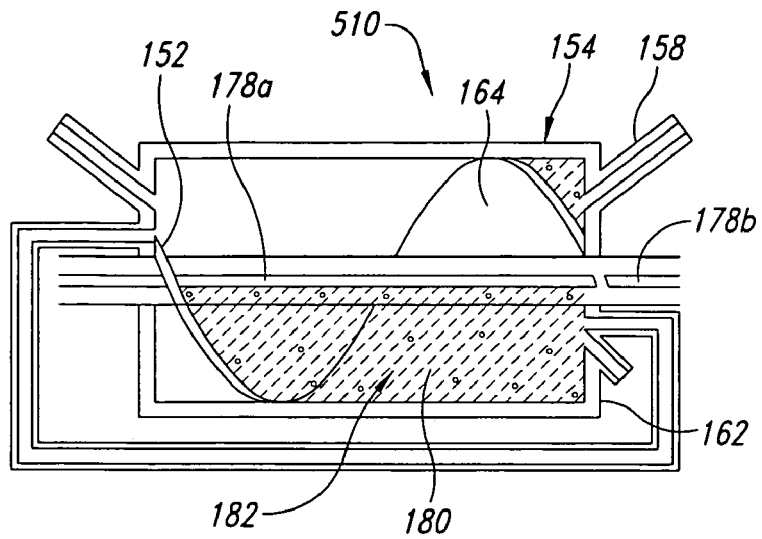
Figure 6F:
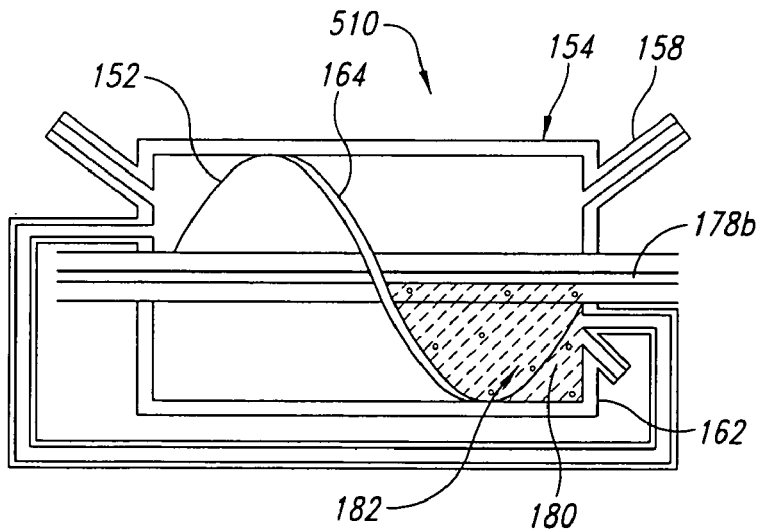
Figure 6G:
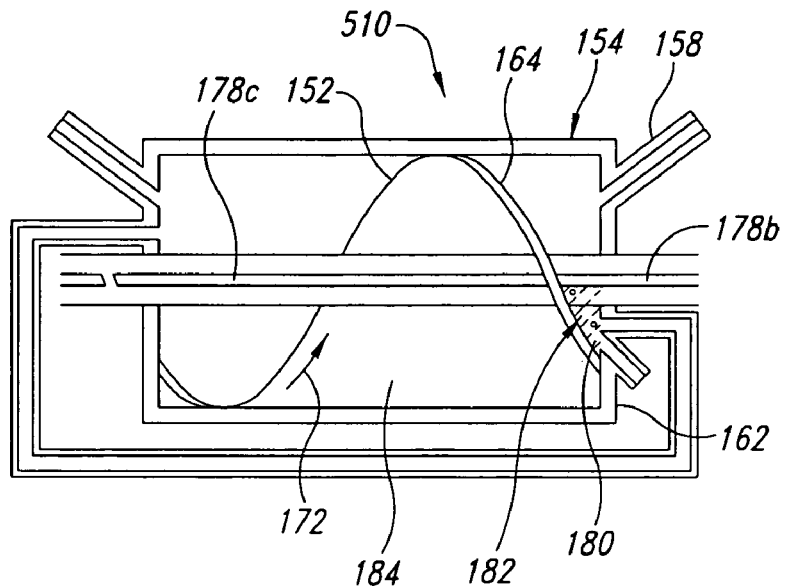
Figure 6H:
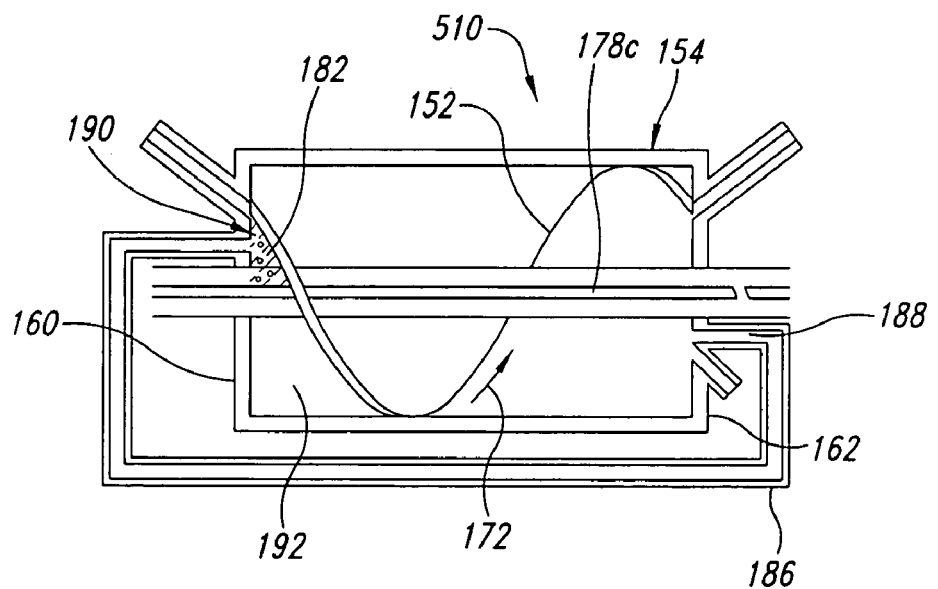
Figure 6I:
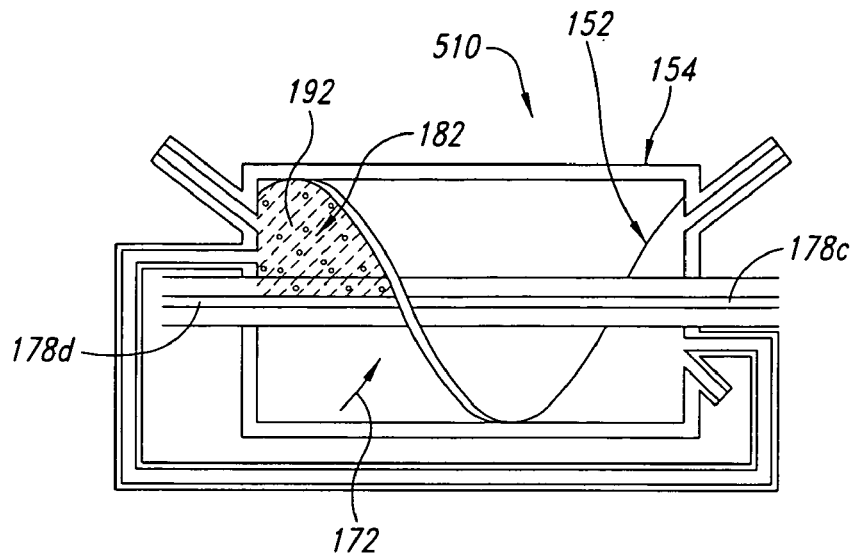
Figure 6J:
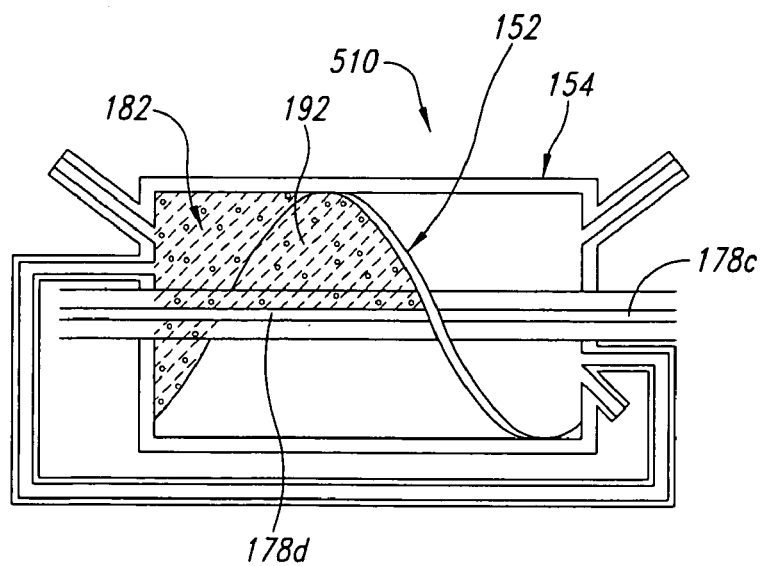
Figure 6K:
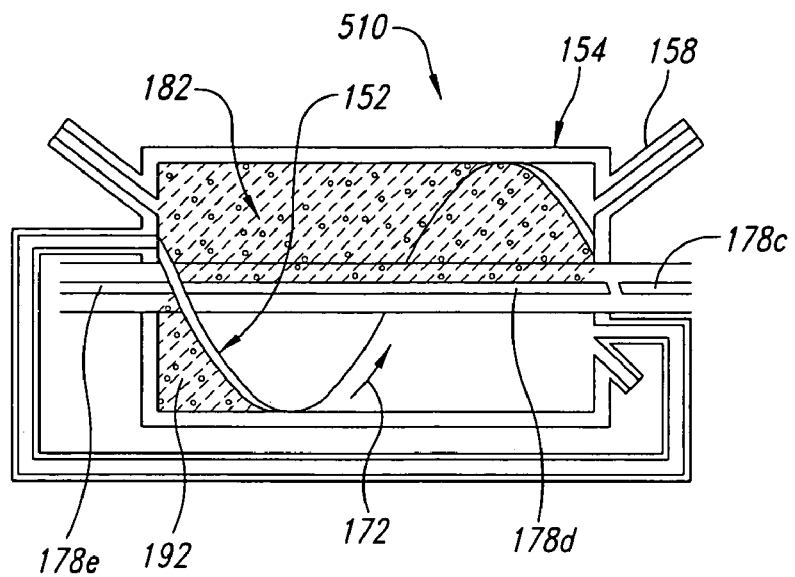
Figure 6L:
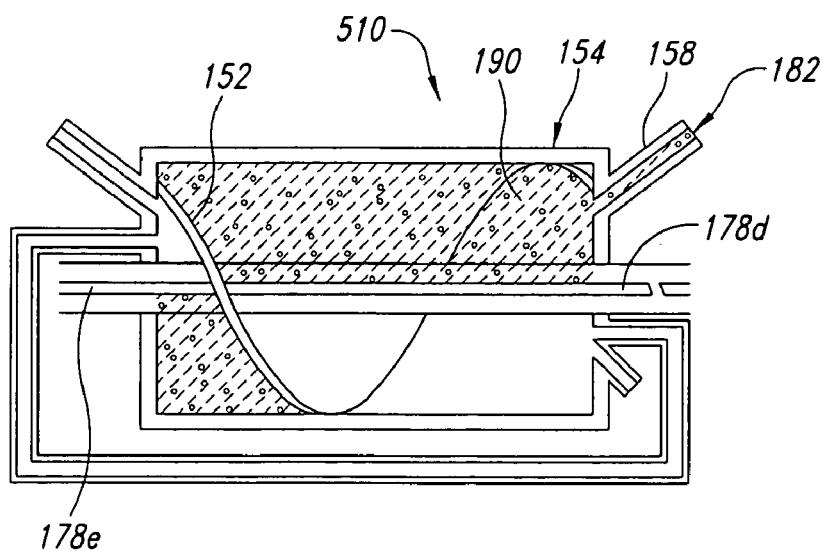
Figure 6M:
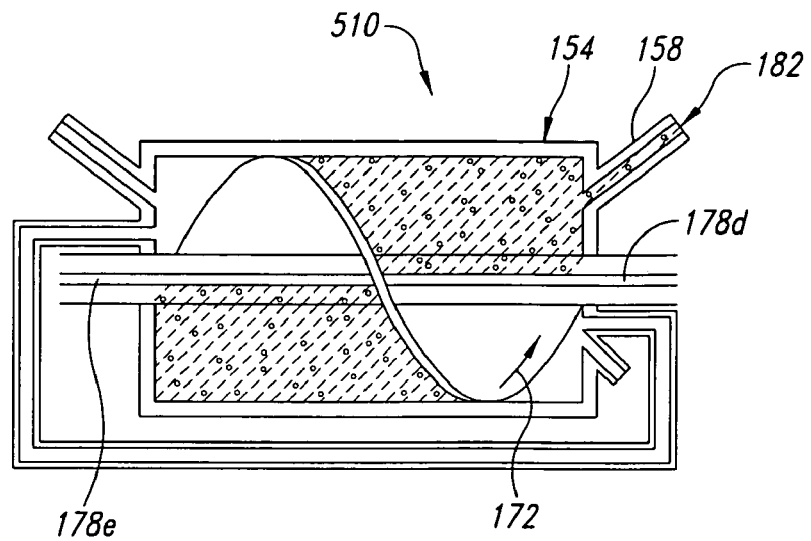
Figure 6N:
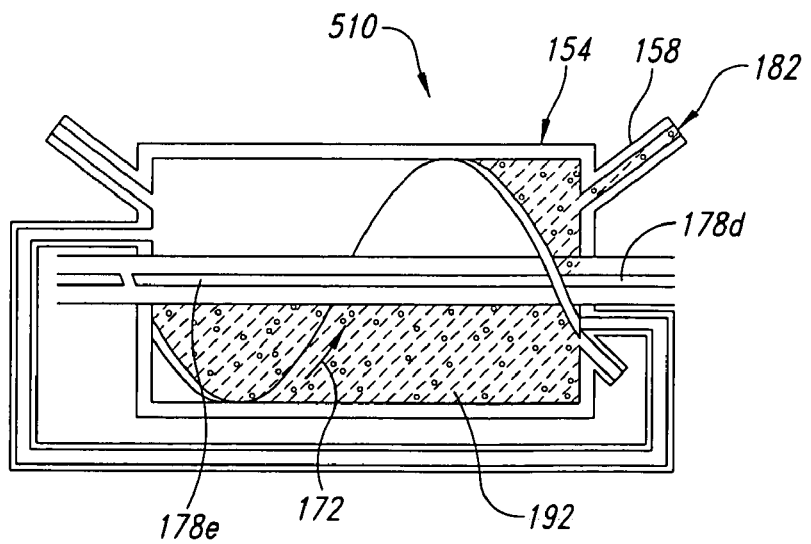
Figure 6O:
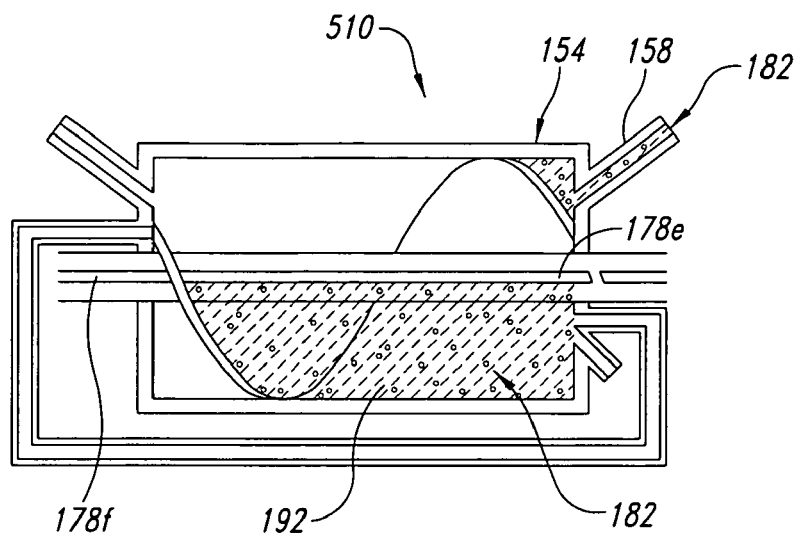
Figure 6P:
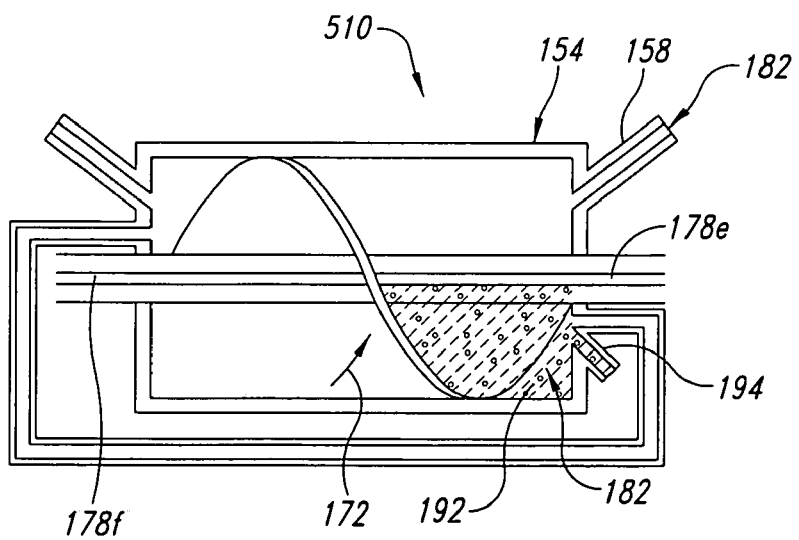
Figure 6Q:
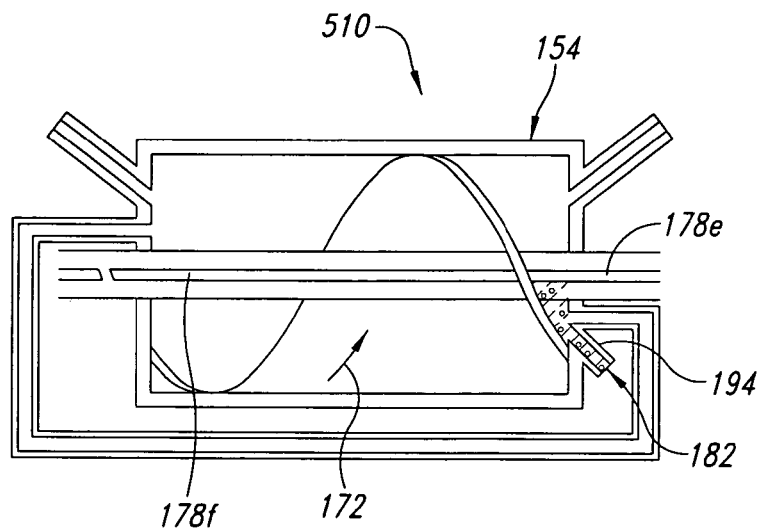

Turning next to FIGS. 6A-6Q, shown therein are cross-sectional views of a helical screw engine 150 formed in accordance with yet a further embodiment of the invention. The engine 150 includes a helical screw 152 rotatably mounted within a casing 154 having an intake port 156 and an exhaust port 158 formed at opposing first and second end walls 160, 162, respectively. The helical screw 152 is formed to have a single helix 164 formed around a central shaft 166 with each end 168, 170 of the shaft 166 journaled in the respective sides 160, 162 of the casing 154. The helix 164 is a right-hand helix that is rotated clockwise as shown by the arrow 172.

Cooperating with the casing and the helical screw 152 is a platen chain 176 formed of individual platens 178 that are slidably received within a slit (not shown) in the casing 154 in the manner described above with respect to the embodiments of FIGS. 2 through 5A-5B. The platens are sized and shaped to have a close fit with the helical screw 152 and the casing 154 to thus provide at least one chamber 180 within the casing 154 for compressing and combusting fluid.

In operation, as a leading edge 174 of the helix 164 passes by the intake 156 in the rotational direction shown by the arrow 172, a combustible mixture 182 is drawn into the casing 154. As the helical screw 152 makes almost a full rotation as shown in FIG. 6B, the chamber 180 is completely filled with the combustible mixture 182. At this point, the chamber, defined by the casing 154, the platen 178, and the helical screw 152 is then sealed off by rotation of the helix 174 past the intake 156, as shown in FIG. 6C. Compression of the combustible mixture 182 then takes place as shown in FIGS. 6D-6F. Here, rotation of the helical screw 152 in cooperation with the moving platen 178 forces the combustible mixture 182 to move towards the second end wall 162 of the casing 154. The exhaust port 158 will be closed, such as by a valve, to ensure the combustible mixture 182 does not escape from the chamber 180. As shown in FIG. 6D, two adjacent platens 178a and 178b now cooperate with the helical screw 152 in defining the chamber 180 and compressing the combustible mixture 182.

Referring next to FIG. 6G, the combustible mixture 182 has now achieved maximum compression between the flight 164, the platen 178b, and the second wall 162 of the casing 154. In the meantime, a second chamber 184 defined by the helical screw 152, a third platen 178c, and the casing 154 is at the intake stage where a combustible mixture is being drawn in by the rotation of the helical screw 152.

The combustible mixture 182 is then ignited. At ignition, as shown in FIG. 6H, the combusted mixture 182 is vented through a vent line 186 from an outlet port 188 in the second side wall 162 of the casing 154 to an inlet port 190 formed in the first side wall 160 of the casing 154. The high-pressure mixture 182 is introduced into another chamber 192 formed by the flight 164, the casing 154, and a fourth platen 178d. The high-pressure gas 182 drives the helical screw 152 through a power cycle as shown in FIGS. 6H-6J.

The exhaust cycle starts in FIG. 6K, where the exhaust port 158 is opened and the exhaust gas 182 is forced out the exhaust port 158 as the helical screw 152 rotates. For ease of illustration, new combustion gases drawn into the casing 154 are not shown. FIGS. 6L-6O illustrate the exhausting of the combusted gases 182 out of the chamber 192 with the cooperation with platens 178c, d, and e.

Turning to FIG. 6P, as the helical screw 152 continues to rotate, the chamber 192 is blocked off from the exhaust port 158, trapping the exhaust gases 182 within the casing 154. In FIG. 6Q, an additional exhaust port 194 is shown formed in the second wall 162 of the casing 154 radially opposite of the first exhaust port 158. The second exhaust port 194 is valved to open when the first exhaust port 158 becomes closed off to the chamber 192. This permits complete evacuation of the chamber 192 and the ending of one complete cycle.

Figure 7:
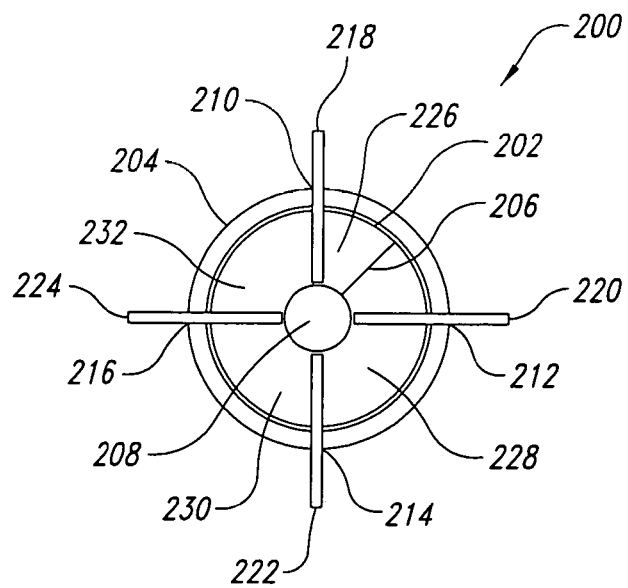
FIG. 7 is a cross-sectional view of a four-chambered engine formed in accordance with another embodiment of the present invention.

Referring next to FIG. 7, shown therein is yet another embodiment of the invention in the form of a four-chambered thermodynamic combustion engine 200. Here, a helical screw 202 is rotatably mounted within a casing 204 in the manner described above with previous embodiments. The helical screw 202 includes a helix 206 formed about a central shaft 208. The casing has a plurality of slits 210, 212, 214, 216 radially spaced equidistantly about the circumference of the casing 204 at 90 degree intervals. Slidably received within each of the slits 210, 212, 214, 216 are platen chains 218, 220, 222, 224. Thus, the helical screw 202 cooperates with the casing 204 and the platen chains 218, 220, 222, 224 to form four individual chambers 226, 228, 230, 232. This arrangement would be analogous to a four-cylinder piston engine. It is to be understood that valving for intake and exhaust would be provided along the lines outlined above with respect to the engine 150 illustrated in FIGS. 6A-6Q.

The various components of the embodiments described above are constructed of materials suitable to the intended use. These materials can include metals and composite plastics designed to withstand the forces generated in conveying, pressurizing or combusting materials.

Although preferred embodiments of the invention have been illustrated and described, it is to be understood that various changes may be made therein without departing from the spirit and scope of the invention. For example, the fuel for the engine can be injected, or a turbo-charger can be utilized, or the design can be modified for diesel combustion. Hence, the invention is to be limited only by the scope of the claims that follow and their equivalents.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A system for moving objects, comprising:
an input for receiving the objects;
a helical screw means receiving objects from the input;
means for containing the objects on the helical screw means and means for forming a plurality of movable compartments in cooperation with the helical screw means, the helical screw means structured to rotate about a longitudinal axis in a fixed longitudinal position in the containing means so that the helical screw means does not move longitudinally relative to the containing means, and the means for forming a plurality of compartments comprising a plurality of platens, each platen positioned between adjacent flights of a same helix of the helical screw means to form a compartment of the plurality of compartments; and
means for driving the helical screw means wherein the driving means comprises means for igniting the objects within selected compartments formed by the platens, the casing, and the helical screw means to initiate the combustion of the objects and drive the helical screw means to rotate about a longitudinal axis of a shaft of the helical screw means.

2. The system of claim 1, wherein the plurality of platens are coupled together in a continuous loop and the means for containing comprises a casing in which the helical screw means is mounted, the casing having an elongate opening for receiving the chain of platens, each platen forming a wall between flights of the helical screw means that moves along the longitudinal axis as the helical screw means rotates.

3. A system, comprising:
an input for receiving objects;
a helical screw means receiving objects from the input;
means for containing the objects on the helical screw means and means for forming movable compartments in cooperation with the helical screw means;
means for driving the helical screw means;
an output for receiving objects from the helical screw means;
wherein the means for forming movable compartments on the helical screw means comprise a plurality of platens coupled together in a continuous loop and the means for containing the objects on the helical screw means comprises a casing in which the helical screw means is mounted, the casing having an elongate opening for receiving the chain of platens, each platen positioned between flights of the helical screw means to form a wall between flights of the helical screw means; and
wherein the driving comprises means for igniting the objects within selected compartments formed by the platens, the casing, and the helical screw means to initiate combustion of the objects and drive the helical screw means to rotate about a longitudinal axis of a shaft of the helical screw means.

4. A device, comprising
an enclosure having a first opening and a second opening;
an elongate shaft mounted in the enclosure to rotate about a longitudinal axis of the shaft while not moving longitudinally in the casing, the shaft comprising a helical member extending outward from the shaft and along a length of the shaft;
a plurality of platens coupled together and engaged with the helical member and, along with the casing forming a plurality of compartments that move as the helical member rotates with the shaft, each platen sized and shaped to fit between adjacent flights of the helical member to form a movable wall as part of the compartment defined by the wall, the helical member, and the casing; and
an igniter that is adapted to ignite a combustible mixture within selected compartments of the plurality of compartments and thereby drive the shaft to rotate.

* * * * *